(12) United States Patent
Hyde, II et al.

(10) Patent No.: US 8,230,131 B2
(45) Date of Patent: Jul. 24, 2012

(54) DATA MIGRATION TO HIGH SPEED STORAGE IN ACCORDANCE WITH I/O ACTIVITY OVER TIME

(75) Inventors: Joseph Smith Hyde, II, Tucson, AZ (US); Bruce McNutt, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 12/559,362

(22) Filed: Sep. 14, 2009

(65) Prior Publication Data

US 2011/0066767 A1     Mar. 17, 2011

(51) Int. Cl.
*G06F 3/00* (2006.01)
*G06F 12/00* (2006.01)
*G06F 13/00* (2006.01)
(52) U.S. Cl. .......................... 710/18; 711/165
(58) Field of Classification Search .................. None
See application file for complete search history.

(56) References Cited

U.S. PATENT DOCUMENTS

| 7,225,211 | B1 | 5/2007 | Colgrove et al. | 707/205 |
|---|---|---|---|---|
| 2003/0140207 | A1 | 7/2003 | Nagase et al. | 711/167 |
| 2005/0138198 | A1 | 6/2005 | May | 709/233 |
| 2006/0161648 | A1* | 7/2006 | Ding et al. | 709/224 |
| 2006/0259728 | A1 | 11/2006 | Chandrasekaran et al. | 711/170 |
| 2008/0059718 | A1 | 3/2008 | Tajima et al. | 711/148 |
| 2008/0229048 | A1 | 9/2008 | Murase et al. | 711/171 |
| 2008/0297599 | A1 | 12/2008 | Donovan et al. | 348/143 |

OTHER PUBLICATIONS

Dasgupta, K.; Ghosal, S.; Jain, R.; Sharma, U.; Verma, A.; , "QoSMig: adaptive rate-controlled migration of bulk data in storage systems," Data Engineering, 2005. ICDE 2005. Proceedings. 21st International Conference on , vol., no., pp. 816-827, Apr. 5-8, 2005 doi: 10.1109/ICDE.2005.116.*
Joseph Hall, Jason Hartline, Anna R. Karlin, Jared Saia, and John Wilkes. 2001. On algorithms for efficient data migration. In Proceedings of the twelfth annual ACM-SIAM symposium on Discrete algorithms (SODA '01). Society for Industrial and Applied Mathematics, Philadelphia, PA, USA, 620-629.*

* cited by examiner

*Primary Examiner* — Eron J Sorrell
*Assistant Examiner* — Dayton Lewis-Taylor
(74) *Attorney, Agent, or Firm* — John H. Holcombe

(57) ABSTRACT

Methods, controllers for data storage, data storage systems, and computer program products are directed to migrating data after the initial placement of the data in data storage entities having higher speed and in other data storage. Steps of a method to migrate data to the higher speed data storage are (1) identifying at least one group of data having had at least one I/O activity in each of a plurality of intervals of time, occurring over a string of multiple intervals of time, wherein the I/O activity is with respect to the other data storage from which data is to be migrated. The time for each of the multiple intervals is selected such that bursts of the I/O activity are likely to be contained in one interval. (2) The identified group of data is classified to the higher speed data storage and migrated.

4 Claims, 3 Drawing Sheets

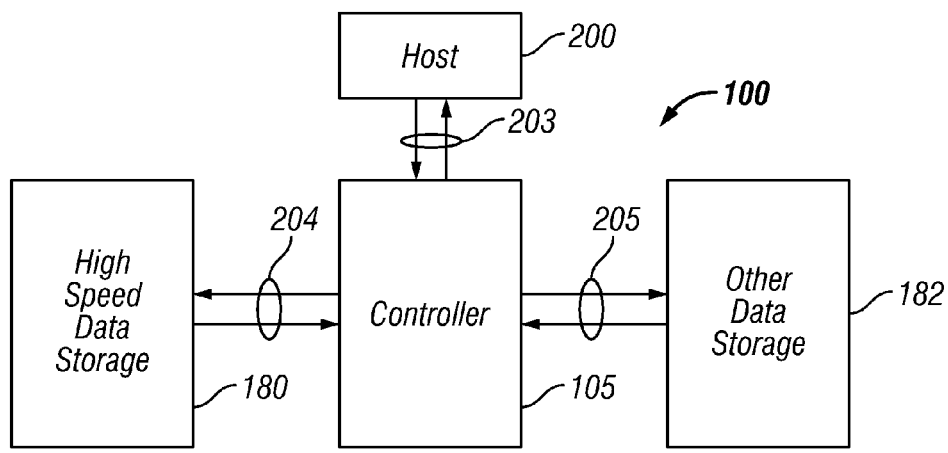
FIG. 2
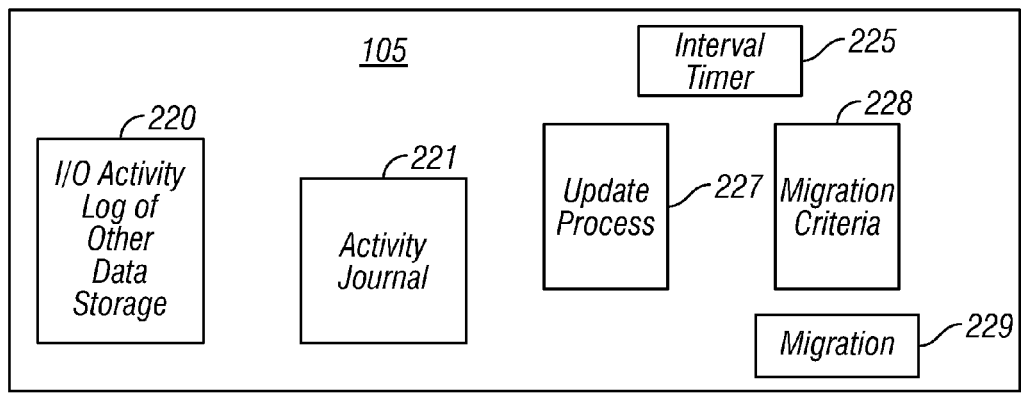
FIG. 3
| I/O Activity Journal | | | |
|---|---|---|---|
| Data Group | Moving Average | Current Int. | Last I/O |
|  |  | 0 | 2507 |
|  |  | 1 | 2590 |
|  |  | 0 | 2485 |
|  |  | 0 | 2590 |
| ⋮ | ⋮ | ⋮ | ⋮ |
FIG. 4

DATA MIGRATION TO HIGH SPEED STORAGE IN ACCORDANCE WITH I/O ACTIVITY OVER TIME

FIELD OF THE INVENTION

This invention relates to data storage, and more particularly to the migration of data between data storage entities.

BACKGROUND OF THE INVENTION

Data storage entities may have various performance capabilities and cost points. For example, cache memory may have fast access to data and to store data, but be relatively costly. Disk drives may have slower access times (due to seek times) and be relatively inexpensive. Flash memory is a non-volatile sequential semiconductor memory and, as such, is unable to support DMA (direct memory access) data transfer. Hence, flash memory may be arranged as SSD (Solid State Drives) as is known to those of skill in the art. SSD flash memory has low latency, but not high band width, and thus is in between disk drives and cache memory from a performance standpoint, as is known to those of skill in the art, and is also in between from the standpoint of cost.

Controllers for data storage systems (also called storage controllers and servers) typically control access to data storage media and memories in response to read and write requests. The storage controllers may direct the data to cache, non-volatile storage, SSD flash memory, and data storage devices such as RAID (redundant array of independent disks), JBOD (just a bunch of disks), and other redundancy levels of disk drives.

As an example, an IBM® ESS (Enterprise Storage Server) such as a DS8000 has redundant clusters of computer entities, cache, non-volatile memory, etc., responsive to hosts to store the data in a virtual manner, tracking the actual data for subsequent retrieval. The data is typically stored as directed by the controller so as to be available, or made available, to the requesting entity, with data of a type that is likely to be needed again right away, as in bursts of activity, stored in the faster speed data storage, and the bulk of the data stored in slower speed data storage. In one example, the slower speed data storage is disk drives, and the higher speed data storage is SSD flash memory.

Data may be arranged in various units of data of constant or variable sizes. In one example, data is arranged in units of data called "extents". In another example, data is arranged in units of data called "data sets". In still another example, data is arranged in units of data called "sectors". Another example is related to addressing and is called "LUN"s for Logical Units. Other examples are known to those of skill in the art. Hence, herein, the generic term used is "group" or "groups".

SUMMARY OF THE INVENTION

Methods, controllers for data storage, data storage systems, and computer program products are directed to migrating data after the initial placement of the data in the various data storage entities.

In one embodiment, a method for migrating data of a data storage system comprising data storage having higher speed and comprising other data storage, the method comprises the steps of:

identifying at least one group of data having had at least one indicated I/O activity in each of a plurality of intervals of time, occurring over a string of multiple intervals of time, the I/O activity with respect to the data storage from which data is to be migrated, wherein the time for each of the multiple intervals selected such that bursts of the I/O activity are likely to be contained in one interval; and classifying the identified group(s) of data to the higher speed data storage.

Another embodiment additionally comprises the step of monitoring the I/O activity separately for each group of data, and monitoring for the occurrence of indicated I/O activity in an interval; and wherein the identifying step comprises identifying groups of data having the I/O activity over a string having a limited group of the intervals.

In a further embodiment, the identifying step comprises identifying the I/O activity employing a moving average of the intervals.

In a still further embodiment, the moving average is weighted with greater weight to more recent the I/O activity.

In yet a further embodiment, the moving average comprises an exponential weighting.

In a further embodiment, the moving average comprises:

$P=(1-W)*P\_last=W*S$, where:

i. P=present value of exponentially weighted moving average;
ii. P_last=last preceding value of P;
iii. W=weighting of each interval; and
iv. S=1 if I/O activity occurred within interval, 0 if no I/O activity.

In another embodiment, the intervals are substantially equal in length of time.

In a further embodiment, the length of time is substantially one hour.

In another embodiment, the monitored strings of intervals comprise at least one group of consecutive intervals.

In a further embodiment, the monitored strings of intervals skip at least one period of time.

In another embodiment, the identifying step updates a monitored string of intervals of a group of data in response to an I/O to the group of data.

In another embodiment, a controller is provided for a data storage system comprising data storage having higher speed and comprising other data storage. The controller comprises computer processor(s) configured to operate the data storage system, and memory(ies) configured to store a computer readable program. When executed on the computer processor(s), the data storage system is operated to indicate I/O activity with respect to groups of data; identify at least one group of data having had at least one indicated I/O activity in each of a plurality of intervals of time, occurring over a string of multiple intervals of time, the I/O activity with respect to the data storage from which data is to be migrated, wherein the time for each of the multiple intervals selected such that bursts of I/O activity are likely to be contained in one interval; and classify the identified group(s) of data to the higher speed data storage.

In still another embodiment, a data storage system comprises data storage entity(ies) configured to store data and having higher speed; other data storage entity(ies) configured to store data; and a controller. The controller is configured to indicate I/O activity with respect to groups of data; identify at least one group of data having had at least one indicated I/O activity in each of a plurality of intervals of time, occurring over a string of multiple intervals of time, the I/O activity with respect to the data storage from which data is to be migrated, wherein the time for each of the multiple intervals selected such that bursts of I/O activity are likely to be contained in one interval; classify the identified group(s) of data to the higher speed data storage; and migrate the classified group(s) of data to the higher speed data storage.

For a fuller understanding of the present invention, reference should be made to the following detailed description taken in conjunction with the accompanying drawings.

BRIEF DESCRIPTION OF THE DRAWINGS

FIG. 2 is a diagrammatic representation of I/O of the data storage system of FIG. 1;

FIG. 3 is a block diagram representation of functional operations of the data storage system of FIG. 1;

FIG. 4 is a table representing I/O activity of data groups with respect to the storage system of FIG. 1.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
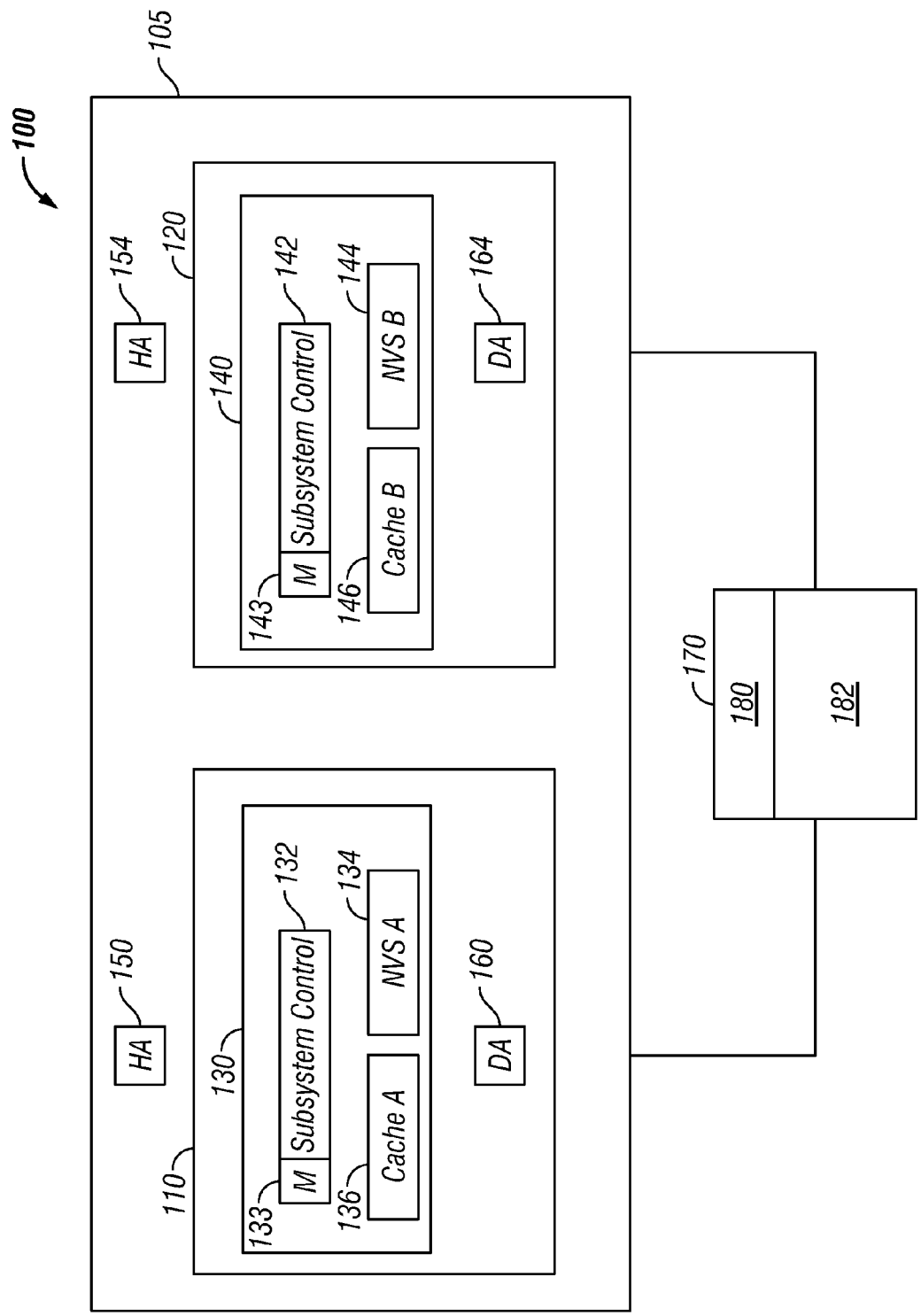
FIG. 1 is a block diagram of an exemplary data storage system which may implement the present invention.
Figure 5:
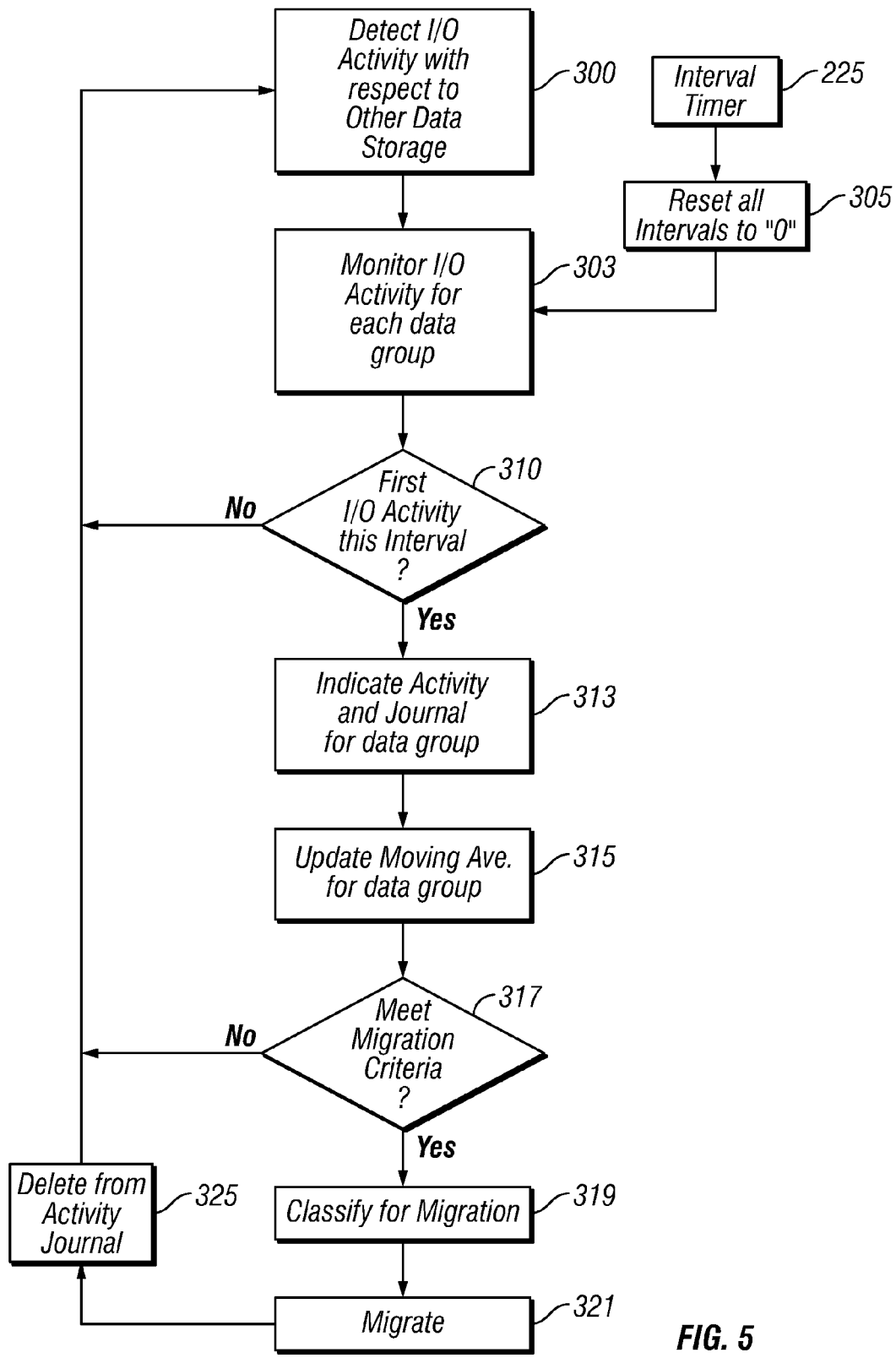
FIG. 5 is a flow chart depicting an exemplary method of operating the data storage system of FIGS. 1 and 2.

Referring to FIG. 1, a data storage system 100 comprises a controller 105 having a cluster 110 and another cluster 120. Cluster 110 comprises a complex 130 embodying at least subsystem control 132, a local non-volatile data storage 134, and local cache data storage 136. Similarly, cluster 120 comprises a complex 140 embodying at least subsystem control 142, a local non-volatile data storage 144, and local cache data storage 146. In each cluster of the controller 105, the subsystem control may be wholly separate from the remainder of the complex, or may be partially embodied by the local non-volatile data storage and/or local cache data storage. Further, the cache data storage and the non-volatile storage may comprise different areas of a memory system. The subsystem control 132, 142 comprises computer processor(s) configured to operate the data storage system, and memory(ies) 133, 143 configured to store information and computer readable program information for operating the computer processor(s). Herein "computer processor" or "control" may comprise any suitable logic, programmable logic, microprocessor, and associated or internal memory for responding to program instructions, and the associated or internal memory may comprise fixed or rewritable memory or data storage devices. The program information may be supplied to the subsystem control or memory from a host or via a data storage drive or disk array, or by an input from a floppy or optical disk, or by being read from a cartridge, or by a web user interface or other network connection, or by any other suitable means. The program information thus may comprise one or more program products comprising a computer useable medium having computer usable program code tangibly embodied therein for operating the cluster 110 and/or for operating the cluster 120, or similar types of systems or devices.

The non-volatile data storage 134, 144 may comprise a memory system having a battery backup that protects data even if power is lost, or other suitable non-volatile memory. Cache data storage 136, 146 may comprise any suitable memory system and may be volatile, potentially losing data after power is removed.

Host adapters 150, 154 may comprise one or more Fibre Channel ports, one or more FICON ports, one or more ESCON ports, one or more SCSI ports, or other suitable ports. Each host adapter is configured to communicate with a host system and to both cluster 110 and cluster 120 such that each cluster can handle I/O from any host adapter.

Device adapters 160, 164 may comprise communication links for communication with data storage 170. The communication links may comprise serial interconnections, such as RS-232 or RS-422, Ethernet connections, SCSI interconnections, ESCON interconnections, FICON interconnections, a Local Area Network (LAN), a private Wide Area Network (WAN), a public wide area network, Storage Area Network (SAN), Transmission Control Protocol/Internet Protocol (TCP/IP), the Internet, and combinations thereof.

An example of a data storage subsystem 100 comprises an IBM®Enterprise Storage Server, IBM® Model DS 8000, or other comparable system.

As discussed above, the data storage 170 comprises data storage 180 having higher speed and comprises other data storage 182. An example of other data storage 182 comprises disk drives, which may utilize RAID (Redundant Array of Independent Disks) protocols, or may comprise JBOD (Just a Bunch of Disks). An example of higher speed data storage 180 comprises flash memory arranged as SSD (Solid State Drives). The flash memory may also be arranged to provide redundancy such as a RAID arrangement. The speed difference between the high speed data storage and other data storage is relative.

In one alternative, the higher speed data storage may comprise high speed memory devices such as RAM (Random Access Memory), and the other data storage may be the flash memory.

In another alternative, the controller may comprise a processing system with one cluster having suitable redundancies.

Referring to FIG. 2, the storage system 100 is responsive to host(s) 200 and performs I/O 203 to store data in a virtual manner, tracking the actual data for subsequent retrieval. The data is typically stored as directed by the controller 105 so as to be available, or made available, to the requesting host. The data may be stored in and retrieved from high speed data storage 180 via transmissions 204, and may be stored in and retrieved from other data storage 182, via transmissions 205. Data may be initially stored based on some type of estimate of future accesses, with data of a type that is likely to be needed again right away, as in bursts of activity, stored in the higher speed data storage 180, and the bulk of the data stored in slower speed data storage 182. Data stored in the higher speed data storage 180 that is not accessed as estimated or is no longer accessed may be migrated to the slower speed data storage 182 using, for example, a LRU (least recently used) algorithm. The data migration may be via transmissions 204 and 205 through the controller 105, or alternatively, be directly between higher speed storage 180 and other data storage 182 under the control of controller 105.

As discussed above, data may be arranged in various units of data of constant or variable sizes. In one example, data is arranged in units of data called "extents". In another example, data is arranged in units of data called "data sets". In still another example, data is arranged in units of data called "sectors". Another example is related to addressing and is called "LUN"s for Logical Units. Other examples are known to those of skill in the art. Hence, herein, the generic term used is "group" or "groups".

Referring to FIGS. 1, 2, 3, 4 and 5, controller 105 is configured to control migration of data in data storage system 100 from the other data storage 182 to higher speed data storage 180. Typically, data is migrated in the opposite direction from the higher speed data storage 180 to the other data storage 182, for example, to accommodate new data in the higher speed data storage. In the present invention, controller 105 provides an identification of data that is most likely to benefit from higher speed data storage 180. The size of the data item may be flexible or fixed, all as discussed above, and each called a group of data herein. In most cases, the activity of smaller units of data, such as extents (for example of 1 GB), tends to be transient; thus, even heavy activity may be followed by long idle periods. On the other hand, data that is an exception to this rule typically accounts for a large portion of overall I/O.

The controller is configured 105 to indicate I/O activity 203, 205 with respect to groups of data, with specific interest in I/O with respect to groups of data stored in the slower speed other data storage 182. That is, the I/O activity is with respect to the data storage from which data is to be migrated or promoted. The controller 105 looks at intervals of time and indicates at least one I/O activity indicated in an interval of time. The length of time for each of the multiple intervals is selected such that bursts of I/O activity are likely to be contained in one interval. Bursts of activity beyond the one I/O activity within the same interval are ignored. The intervals may be measured by an interval timer 225, and, for example, may comprise one hour. One way that the interval timer 225 may operate is to count the hours since the initial IML of the system. One example is to subtract an offset for the time of the initial IML from the system clock, then extract the hour part of the result.

The I/O activity that is indicated may be obtained by monitoring an I/O activity log 220, and is specifically the I/O activity of the other data storage 182 detected in step 300. If the I/O activity log 220 covers both I/O of the higher speed data storage 180 and the other data storage 182, the I/O activity of the other data storage 182 is extracted and monitored in step 303. The indicated I/O activity may comprise I/O activity having a particular result, such as reading or updating data. Further, the indicated I/O activity for each data group of interest may be monitored. That is, a user may desire that a particular group of data not be migrated to the higher speed storage once it is in the other data storage, and there is no need to monitor the data group. As discussed above, the group of data may be any desired unit of data. It is possible that various types of units of data are considered separate groups, with extents being the monitored groups for one type of data, and data sets being monitored for another type of data.

As discussed above, only the first I/O activity in an interval with respect to a group of data is of concern, and step 310 provides this information. If the I/O activity is not the first I/O activity for the current interval for the monitored group, the process returns to steps 300 and 303.

If the I/O activity is the first I/O activity for the current interval for the monitored group, it is indicated in step 313, for example, in an I/O activity journal 221. Each of the data groups of other data storage 182 having I/O activity may be listed 240 in I/O activity journal 221, and if a data group of other data storage 182 has been dormant without I/O activity and is accessed, it is added to the I/O activity journal. Alternatively, all data groups currently located in other data storage 182 may be listed as data groups 240 in I/O activity journal 221. Still alternatively, activity including I/O activity and other non-I/O activities may be listed in activity journal, and the I/O activity extracted.

One way of indicating that I/O activity is in the most recent interval and that it is the only or first I/O activity for the interval is to track the intervals, for example by number, and compare the interval number of the current I/O activity called "C" to the interval number of the last I/O 242 "L". If the current interval "C" is greater than "L", the I/O activity is the only or the first I/O activity for the data group. Column 243 tracks the I/O activity for the current interval, and is reset to "0" for all data groups at the beginning of an interval, which becomes the current interval. The first I/O activity for a data group for the interval is indicated by entering a "1" in column 243 for that data group, and setting column 242 to the current interval.

Alternatively, I/O activity must occur in more than one interval in a short time period spanning more than one interval before entering information into the I/O activity journal 221. In one example, if the current interval satisfies C>L as discussed above, the I/O activity is entered if C<=L+3, meaning that I/O activity must have also occurred at least in one of the 3 intervals preceding the current interval. This indicates that the I/O activity is not just a single recall or burst of I/O activity, but instead is persistent, such that more I/O activity is likely to occur.

The indication of I/O activity in step 313 updates I/O activity journal 221 in update process 227.

When the interval timer 225 indicates the end of the current interval, step 305 resets all entries in column 243 of the I/O activity journal 221 to "0", and the next interval becomes the current interval.

Recent I/O activity alone is not sufficient to promote a data group to the higher speed data storage 180 from the other data storage 182. The identification of a data group additionally involves updating a monitored string of intervals of a group of data in process 227, for example, in step 315.

The identified I/O activity, for example, must occur in each of a plurality of intervals of time, occurring over a string of multiple intervals of time. The total number of monitored strings of intervals, for example, would be a binary number of intervals, such as 256 intervals. With one interval being a one hour period, 256 hours would be about a week and a half.

In one embodiment, the monitored strings of intervals comprise at least one group of consecutive intervals.

In a further embodiment, the monitored strings of intervals skip at least one period of time. As one example, weekends are skipped. As another example, nights are skipped. Other possibilities may be determined by those of skill in the art to fit a particular situation.

In another embodiment, the identification of a group of data to migrate comprises identifying the I/O activity employing a moving average of the intervals in step 315, which is also updated in the I/O activity journal in the update process 227. Thus, the I/O activity for each of the intervals is incorporated into the average in chronological order. In one example, the moving average is weighting each interval equally, and dropping the oldest interval from the moving average and replacing it with the newest interval's I/O activity. This requires tracking the "0" or "1" for each interval and for each data group of the I/O activity journal 221.

In a still further embodiment, the moving average is weighted with greater weight to more recent the I/O activity.

One way of providing the greater weight to the more recent I/O activity is an exponential weighting. In an exponential moving average, the effect is to diminish the oldest entries to nearly the vanishing point and thereby to effectively eliminate them from the average. In one example, the most recent interval is given a weighting of $\frac{1}{256}$, and is added to an exponentially decreased value of the immediately preceding value of the moving average, for example, decreasing the moving average by multiplying it by 255/256. The 256$^{th}$ oldest entry will thus have been decreased by the multiplication 255 times.

In a further embodiment, the moving average comprises:

$$P=(1-W)*P\_last=W*S, \text{ where:}$$

i. P=present value of exponentially weighted moving average;
ii. P_last=last preceding value of P;
iii. W=weighting of each interval; and
iv. S="1" if I/O activity occurred within interval, "0" if no I/O activity.

Thus, only the present value "P" of the moving average is retained in column 244 of the I/O activity journal 221 for each of the data groups, and "P" becomes "P_last" in the next calculation of the moving average.

In one alternative, when, as discussed above, C<=L+3, meaning that I/O activity must have also occurred at least in one of the 3 previous intervals and in the most recent interval, the present value "P" of the moving average may be determined by individually recalculating the moving average for each of the 4 intervals. In another alternative, the I/O activity "0" or "1" of the recent intervals is averaged and multiplied by the weighting for the recent intervals, such as n/256, and the weighting given the previous moving average is (1−n)/256.

If a number of inactive intervals are involved prior to the recent update to the I/O activity journal 221, comprising a number of "0" entries, the update operation may be simplified, rather than using a full calculation of the formula for each interval, the calculation W*S is equal to "0", simplifying the formula to P=(1−W)*P_last for the "0" intervals, and the overall intervals estimated by making P=P*(1−W), and repetitions of the operation can be simplified with factoring or approximations may be made to approach binary numbers. For example, 128 repetitions of "0" could be simplified to 4 repetitions of P=P*X, where X=(1−W)**32.

Classification of a group of data to the higher speed data storage is based on migration criteria 228, or level of "persistent" I/O activity in step 317, comprising I/O activity over a string of multiple intervals of time, and employs the moving average as a figure of merit for evaluating which group or groups of data would most benefit from the higher speed data storage 180. In one example, the classification to the higher speed data storage may comprise a threshold value of the moving average. For example, the threshold may be set to a value of "0.2", indicating that, over the total number of intervals, essentially there has been I/O activity that meets the defined criteria for persistence, in at least 20% of the intervals. Alternatively, periodically, a predetermined number of groups of data then having the highest value moving average would be classified for the higher speed data storage.

The controller 105 identifies the group or groups of data that meet the migration criteria 228 in step 317 and classifies the group or groups of data for migration in step 319. For the group or groups of data that do not meet the criteria 228, the moving average remains posted in column 244 and the process returns to steps 300 and 303.

For the group or groups of data that are classified for migration in step 319, the controller 105 migrates 229 the group or groups of data from the other data storage 182 to the higher speed data storage 180 in step 321. To make room for the migrated data, it is likely that other groups of data are migrated from the higher speed data storage 180 to the other data storage 182, determined by any suitable algorithm, such as an LRU algorithm. The data migration may be via transmissions 204 and 205 through the controller 105, or alternatively, be directly between higher speed storage 180 and other data storage 182 under the control of controller 105.

Thus, groups of data that have persistent I/O activity over a string of multiple intervals of time are migrated from the other data storage 182 to the higher speed storage 180. Once migrated, the group or groups of data that have been migrated no longer repose in the other data storage 182, and in step 325, are deleted from the I/O activity journal 221, and the process returns to steps 300 and 303.

The implementations may involve software, firmware, micro-code, hardware and/or any combination thereof. The implementation may take the form of code or logic implemented in a medium, such as memory 133, 143, storage 134, 144, 180, 182, and/or circuitry 132, 142, where the medium may comprise hardware logic (e.g. an integrated circuit chip, Programmable Gate Array [PGA], Application Specific Integrated Circuit [ASIC], or other circuit, logic or device), or a computer readable storage medium, such as a magnetic storage medium (e.g. an electronic, magnetic, optical, electromagnetic, infrared, or semiconductor system, semiconductor or solid state memory, magnetic tape, a removable computer diskette, and random access memory [RAM], a read-only memory [ROM], a rigid magnetic disk and an optical disk, compact disk-read only memory [CD-ROM], compact disk-read/write [CD-R/W] and DVD).

Those of skill in the art will understand that changes may be made with respect to the methods discussed above, including changes to the ordering of the steps. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A method for migrating data of a data storage system comprising data storage having higher speed and comprising other data storage, the method comprising the steps of:
    identifying at least one group of said data having had at least one indicated I/O activity in each of a plurality of intervals of time, occurring over a string of multiple intervals of time, said I/O activity with respect to the data storage from which data is to be migrated, ignoring said I/O activity exceeding said one indicated I/O activity, wherein the time for each of said multiple intervals selected such that bursts of said I/O activity are likely to be contained in one interval;
    monitoring said indicated I/O activity separately for each said group of data, and monitoring for the occurrence of I/O activity in an interval;
    wherein said identifying step comprises identifying groups of data having said I/O activity over a string having a limited group of said intervals; and comprises identifying said I/O activity where I/O activity in some said intervals may be inactive, employing a moving average of said one indicated I/O activity and inactivity of said intervals;
    wherein said moving average is weighted with greater weight to more recent said I/O activity, said moving average comprises an exponential weighting, and comprises:

$$P=(1-W)*P\_last+W*S, \text{ where:}$$

P=present value of exponentially weighted moving average;
P_last=last preceding value of P;
W=weighting of each interval; and
S=1 if I/O activity occurred within interval, 0 if no I/O activity; and classifying said identified at least one group of data to said higher speed data storage.

2. A controller for a data storage system, said data storage system comprising data storage having higher speed and comprising other data storage, said controller comprising:
at least one computer processor configured to operate said data storage system; and
at least one memory configured to store a computer readable program when executed on said at least one computer processor, operates said data storage system to:
indicate I/O activity with respect to groups of data;
identify at least one group of said data having had at least one indicated I/O activity in each of a plurality of intervals of time, occurring over a string of multiple intervals of time, said I/O activity with respect to the data storage from which data is to be migrated, ignoring said I/O activity exceeding said one indicated I/O activity, wherein the time for each of said multiple intervals selected such that bursts of said I/O activity are likely to be contained in one interval;
to monitor said indicated I/O activity separately for each said group of data, and monitor for the occurrence of I/O activity in an interval; and
to identify groups of data having said monitored I/O activity over a string having a limited group of said intervals; where I/O activity in some said intervals may be inactive, employing a moving average of said one indicated I/O activity and inactivity of said intervals, wherein said moving average is weighted with greater weight to more recent said I/O activity, said moving average comprises an exponential weighting, and wherein said moving average comprises:

$P=(1-W)*P\_last+W*S$, where:

P=present value of exponentially weighted moving average;
P_last=last preceding value of P;
W=weighting of each interval; and
S=1 if I/O activity within interval, 0 if no I/O activity; and classify said identified at least one group of data to said higher speed data storage.

3. A data storage system comprising:
at least one data storage entity configured to store data and having higher speed;
at least one other data storage entity configured to store data; and
a controller configured to:
indicate I/O activity with respect to groups of data;
identify at least one group of said data having had at least one indicated I/O activity in each of a plurality of intervals of time, occurring over a string of multiple intervals of time, said I/O activity with respect to the data storage from which data is to be migrated, ignoring said I/O activity exceeding said one indicated I/O activity, wherein the time for each of said multiple intervals selected such that bursts of said I/O activity are likely to be contained in one interval;

wherein said controller is additionally configured to monitor said indicated I/O activity separately for each said group of data, and monitor for the occurrence of I/O activity in an interval; and wherein said controller is configured to identify groups of data having said I/O activity over a string having a limited group of said intervals; to identify said I/O activity where I/O activity in some said intervals may be inactive, employing a moving average of said one indicated I/O activity and inactivity of said intervals; wherein said moving average is weighted with greater weight to more recent said I/O activity; wherein said moving average comprises an exponential weighting; and wherein said moving average comprises:

$P=(1-W)*P\_last+W*S$, where:

P=present value of exponentially weighted moving average;
P_last=last preceding value of P;
W=weighting of each interval; and
S=1 if I/O activity within interval, 0 if no I/O activity;
to classify said identified at least one group of data to said higher speed data storage; and
to migrate said classified at least one group of data to said higher speed data storage.

4. A computer program product comprising a computer usable medium storing a computer readable program when executed on at least one computer processor of a data storage system, said data storage system comprising data storage having higher speed, comprising other data storage, and comprising said at least one computer processor; causes the data storage system to perform the steps of:
identifying at least one group of said data having had at least one I/O activity in each of a plurality of intervals of time, occurring over a string of multiple intervals of time, said I/O activity with respect to the data storage from which data is to be migrated, ignoring said I/O activity exceeding said one indicated I/O activity, wherein the time for each of said multiple intervals selected such that bursts of said I/O activity are likely to be contained in one interval;
monitoring said I/O activity separately for each said group of data, and monitoring for the occurrence of I/O activity in an interval;
wherein said identifying step comprises identifying groups of data having said I/O activity over a string having a limited group of said intervals; comprises identifying said I/O activity where I/O activity in some said intervals may be inactive, employing a moving average of said one indicated I/O activity and inactivity of said intervals; wherein said moving average is weighted with greater weight to more recent said I/O activity, said moving average comprises an exponential weighting; and wherein said moving average comprises:

$P=(1-W)*P\_last+W*S$, where:

P=present value of exponentially weighted moving average;
P_last=last preceding value of P;
W=weighting of each interval; and
S=1 if I/O activity occurred within interval, 0 if no I/O activity; and classifying said identified at least one group of data to said higher speed data storage.

* * * * *